May 9, 1961 N. TURAN 2,983,431
RETURN MAILING PIECE FOLDER
Filed July 18, 1958 4 Sheets-Sheet 1
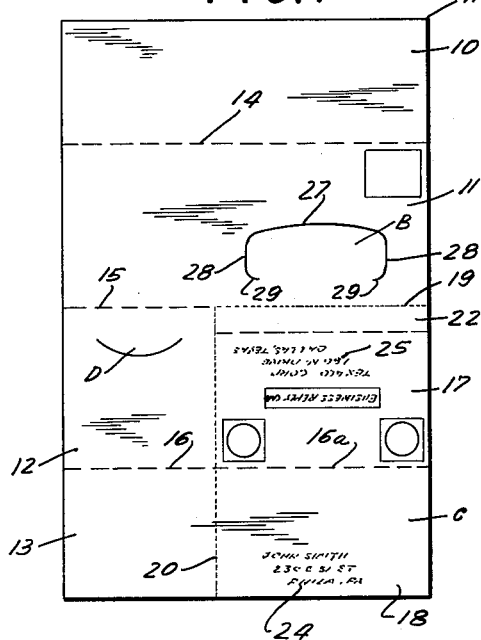
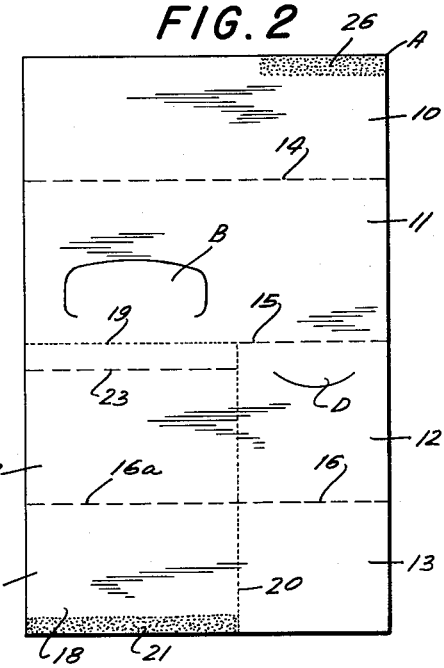
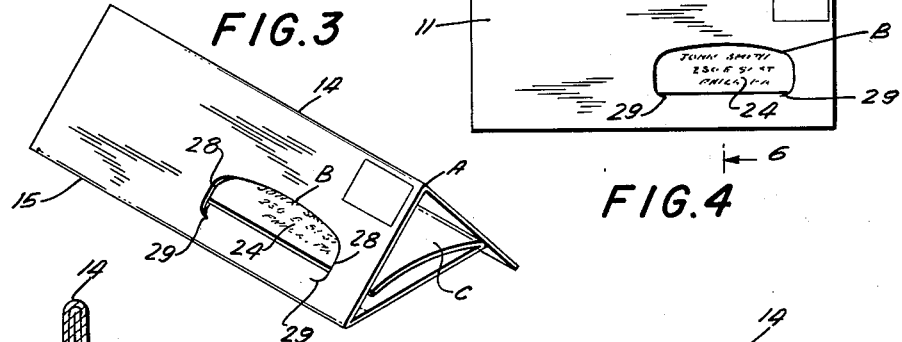
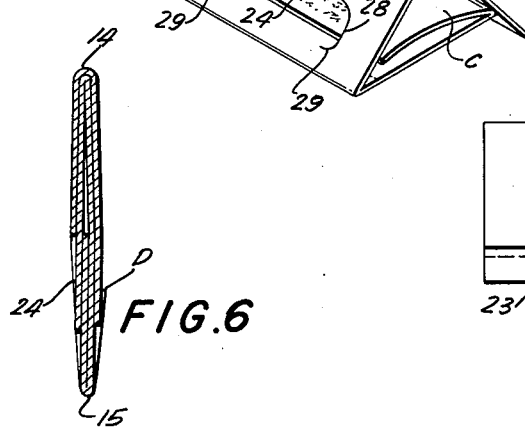
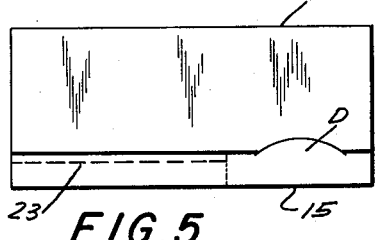
INVENTOR.
NATHANIEL TURAN
BY
ATTORNEY May 9, 1961 N. TURAN 2,983,431
RETURN MAILING PIECE FOLDER
Filed July 18, 1958 4 Sheets-Sheet 2
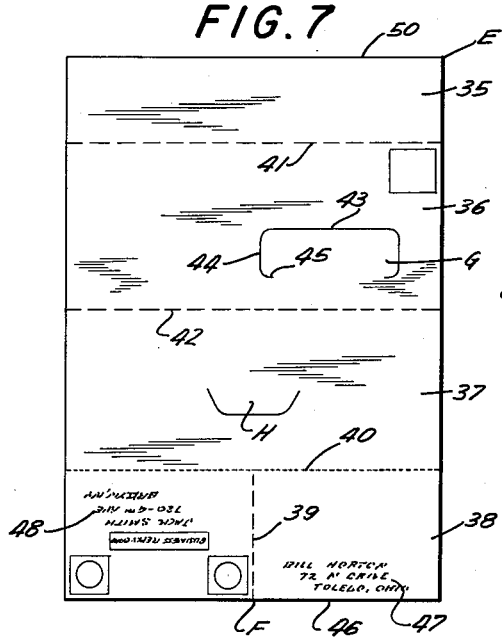
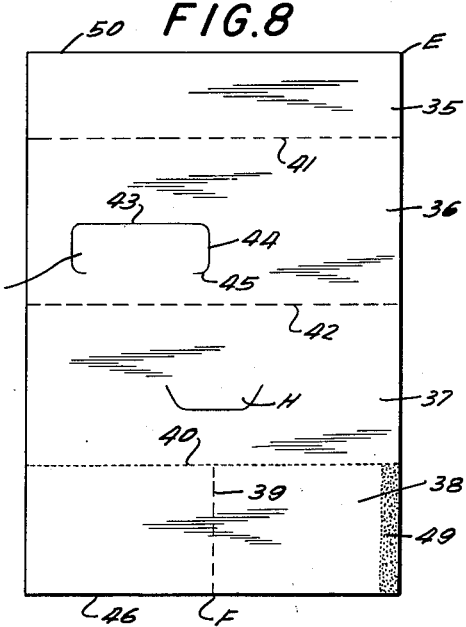
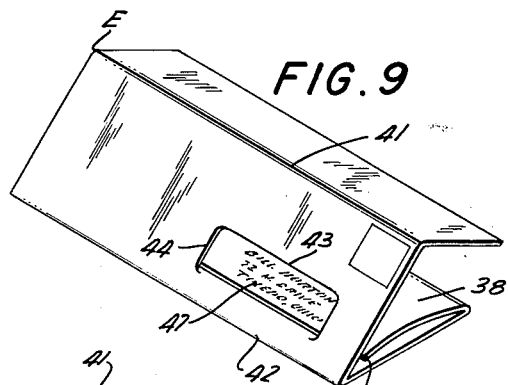
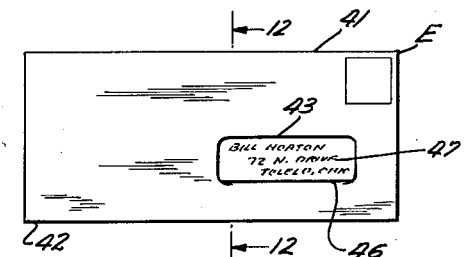
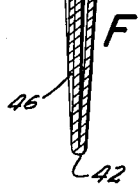
INVENTOR.
NATHANIEL TURAN
BY
ATTORNEY May 9, 1961 N. TURAN 2,983,431
RETURN MAILING PIECE FOLDER
Filed July 18, 1958 4 Sheets-Sheet 3

INVENTOR.
NATHANIEL TURAN
BY
ATTORNEY

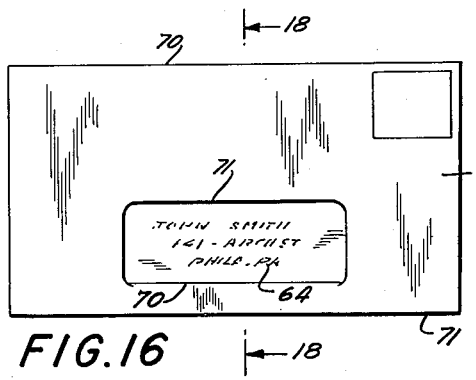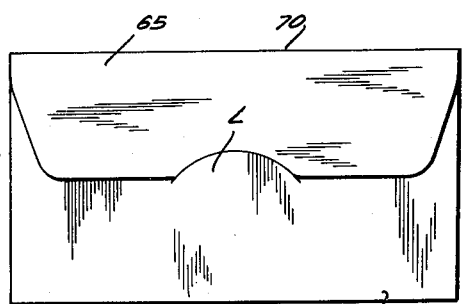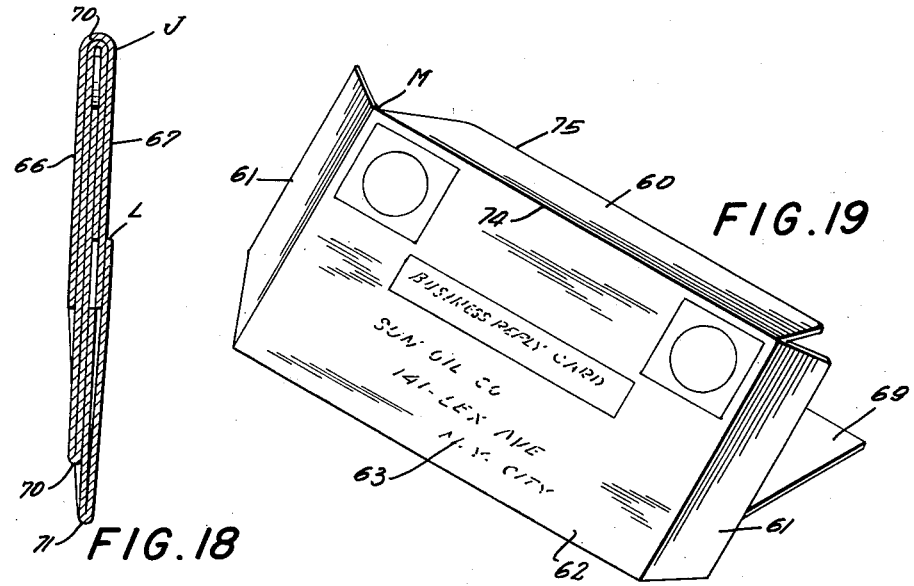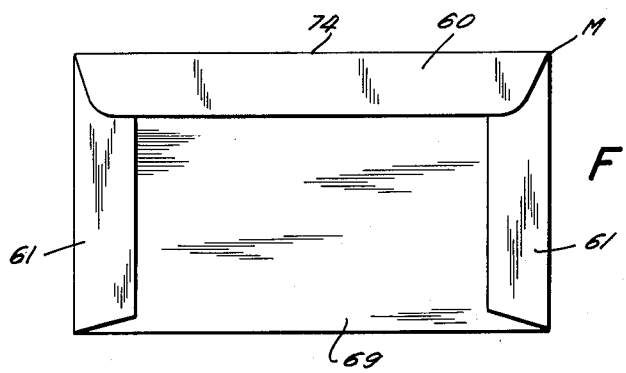

United States Patent Office 2,983,431
Patented May 9, 1961

2,983,431

RETURN MAILING PIECE FOLDER

Nathaniel Turan, % Pickwick Arms Hotel,
230 E. 51st St., New York, N.Y.

Filed July 18, 1958, Ser. No. 749,456

4 Claims. (Cl. 229—92.3)

The present invention relates to a return mailing piece folder and it particularly relates to a return mailing piece folder of the type which may be folded for sending or mailing to an addressee and which upon receipt will provide a return mailing piece for the addressee to return to the original mailer.

It is among the objects of the present invention to provide a novel return mailing piece folder which may be readily printed, die cut and produced at low cost without special machinery and which will automatically permit the address to serve as the signature on the return mailing piece and which will comply with all postal regulations.

Another object is to provide a novel rectangular foldable mailing piece which when unfolded will provide an advertising message and also providing a return mailing piece which may be readily removed and returned by the addressee and which will receive or carry on said return mailing piece the original address of the folded mailing piece so that it will serve as the signature on the return mailing piece.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects according to one embodiment of the present invention the folder may be of four or more sections and is preferably provided with a die cut member having the shape of a partial window which die cut window will serve to retain and hold one of the end folds in position when said fold forms part of the return mailing piece and permits exposure of the signature on the back of the return mailing piece, permitting it also to serve as an address of the outgoing folder from the advertiser to the addressee.

Desirably another section other than that having the partial window will also have a partially cut-out tab to serve as a locking member to hold the final ply in position and enable the folder to be sent as a unit in folded condition through the mails. The return mailing piece is preferably a return mailing card which desirably occupies but part of the space of one of the plies.

However, if desired, the entire width of one of the plies or folders may constitute the return mailing device and the return mailing device may constitute an envelope which may be folded together and glued or adhesively attached along three flaps to form a return mailing enclosure.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 1 is a plan view of an unfolded mailing piece with the return card occupying part of the last two plies and consisting of two folds.

Fig. 2 is a plan view of the reverse side of Fig. 1.

Fig. 3 shows the mailing device and the manner in which the folder of Figs. 1 and 2 may be folded together to form the outgoing mailing device.

Fig. 4 is a front elevational view of the completely folded outgoing mailing folder with the signature of the return mailing piece serving as the address of the complete folder.

Fig. 5 is the reverse view of the folder shown in Fig. 4.

Fig. 6 is a transverse vertical sectional view upon the line 6—6 of Fig. 4, upon an enlarged scale as compared to Fig. 4.

Fig. 7 is a front plan view of an alternative form of mailing folder similar to Fig. 1 but showing a somewhat different embodiment.

Fig. 8 is a plan view of the opposite of Fig. 7.

Fig. 9 is a perspective view showing the manner in which the folder of Figs. 7 and 8 may be folded together to form the outgoing mailing folder.

Fig. 10 is a front plan view of the outgoing folded mailing piece with the return mailing card projecting through the window-like die cut partial opening.

Fig. 11 is a reverse view of the structure as shown in Fig. 10.

Fig. 12 is a transverse sectional view upon the line 12—12 of Fig. 10.

Fig. 16 is a front elevational view of the folded mailing piece.

Fig. 17 is a plan view of the opposite side of the folded mailing piece of Fig. 16.

Fig. 18 is a transverse vertical sectional view upon the line 18—18 of Fig. 16 upon an enlarged scale as compared to Fig. 16.

Fig. 19 is a perspective view showing the return mailing piece consisting of the envelope of Fig. 14 which may be folded together for return to the advertiser or addressor.

Fig. 20 is a back plan view of the completely folded mailing piece of Fig. 19 with the flaps attached and gummed together.

Figure 13:
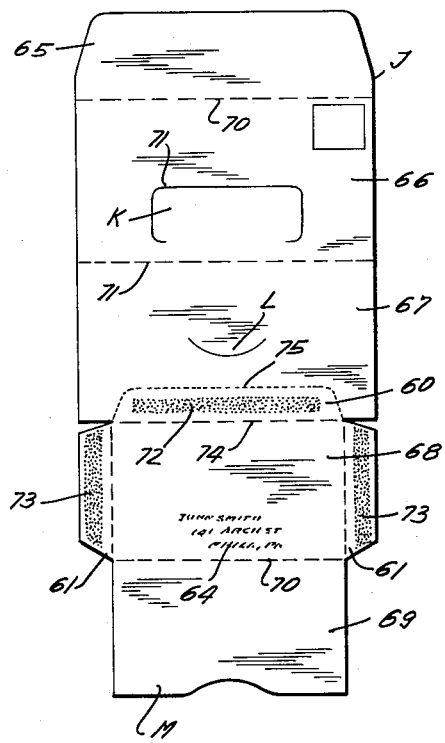
Fig. 13 is a plan view of an alternative form of folding mailing piece with an envelope serving as the detachable return mailing device.

Referring to the embodiment of Figs. 1 to 6, there is shown a mailing folder A which has a partially die cut window opening B, a return double fold mailing piece C and a locking flap D for locking the folder together in the outgoing position as indicated in Figs. 4, 5 and 6.

Referring particularly to Figs. 1 and 2 there are four plies or folds 10, 11, 12 and 13 which have the separated fold lines 14, 15 and 16.

The sections 12 and 13 form the return mailing piece which has two plies 17 and 18 which may be removed by means of the partially perforated lines 19 and 20. On the reverse side of the ply 18 will be the gummed portion 21 for cooperation with and forming a seal with the flap 22 which has the fold line 23. The return mailing piece C is provided with the address of the addressee at 24 and serves as the address of the complete mailing folder as indicated in Figs. 3 and 4 and it also carries the return address 25 of the mailer or advertiser.

It will be noted that there is a gummed portion 26 which is designed to be inserted inside of the die cut portion D and enable the folder to be sealed or gummed together when mailed out. The section or fold 13 is designed to be inserted in front of the flap forming the partially die cut window B so that the address 24 will appear as best indicated in Figs. 3 and 4.

It will be noted that the folding is carried out by first folding the ply or fold 13 against the back of the ply or fold 11 and inside of the die cut 27 having the side cut portions 28 which are partly turned inwardly as indicated at 29.

The folding may be done all manually or automatically as indicated in Fig. 3 and the final ply or fold 10 which is shorter than the other plies or folds may be readily engaged in the die cut tab D as indicated best in Fig. 5.

With or without the gummed attachment 26 the folder as indicated in Figs. 4, 5 and 6 may be readily sent through the mails. Upon receipt, the folder is at the position of Figs. 1 and 2 and the advertising message on the sections 10, 11, 12 and 13 may be read by the addressee who then may detach the return mailing piece C, folding it together on the fold line 16a and sealing the flap 22 against the gummed portion 21.

This folded mailing piece will have as its address the advertiser's address as indicated at 25 and as its signature it will have the address of the mailing folder as indicated at 24, thus assuring a return mailing at a minimum of expense and trouble on the part of the addressee.

In respect to the embodiment of Figs. 8 and 11 this structure is similar to that shown in Figs. 1 to 6, except that the postcard occupies one part of one poly or fold or section and the locking tab is more centralized with the partly die cut window opening being square and taking the shape of a normal window opening.

Referring to Figs. 7 to 11 there is shown a mailing folder E having a short ply 35 and the normal plies or sections 36, 37 and 38. The section 38 forms a two-section mailing folder F having the central fold line 39 and the tear line or perforated line for removal at 40. The other sections are connected together by the fold lines 41 and 42.

The window opening G is formed by the die cut lines 43 forming the top of the window and the side die cut lines 44 forming the sides of the window and the inturned ends 45 forming stops for the inserted edge 46 of the two-section postcard.

In folding together the section 38 is inserted inside of the flap G formed by the die cut edges 43 and 44 as indicated in Fig. 9 and then the short ply 35 is inserted in back of the die cut flap H which locks the assemblage of Figs. 10, 11 and 12 together. The address 47 of the outgoing folded mailer will serve as the signature of the return mailing card whereas the address of the return mailing piece at 48 may be applied before mailing to one side of the two-section mailing folder F as shown at Fig. 7. The gummed facing 49 serves to hold the return mailing piece together when it is detached along the tear line 40. It will be noted that the edge 50 of the short section is inserted under the flap to complete the assembly operation.

The mailing folder of Figs. 7 to 12 is generally similar to that of Figs. 1 to 6 except that the return mailing piece F is formed out of one ply or section 38 instead of two sections as indicated at 12 and 13 of Figs. 1 and 2 with the central locking tab H being somewhat deeper and enabling a complete outgoing mailing folder without the adhesive attachment 26 as indicated in Fig. 2.

Referring to the return envelope mailing piece folder of Figs. 13 to 20 there is provided a folder J having the window opening K with a locking flap L and a return mailing piece M. The return mailing piece M takes the form of an envelope with the flaps 60 and 61 and with the sections 62 carrying the advertiser's address at 63 and its addressee's return signature at 64.

Figure 14:
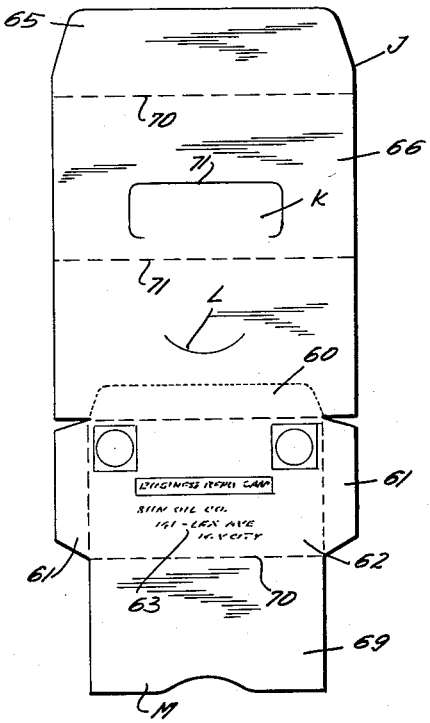
Fig. 14 is a plan view of the opposite side of Fig. 13.

The main fold, as indicated at Figs. 13 and 14 has the flap section 65, the intermediate sections 66 and 67 and the end sections 68 and 69, the latter two forming the return mailing envelope. The flap section has a fold line 70 and the next fold line 71 connects the sections 66 and 67. The envelope sealing flaps are provided with gummed portions 72 and 73 which will form the final sealed envelope as indicated at Fig. 20.

Figure 15:
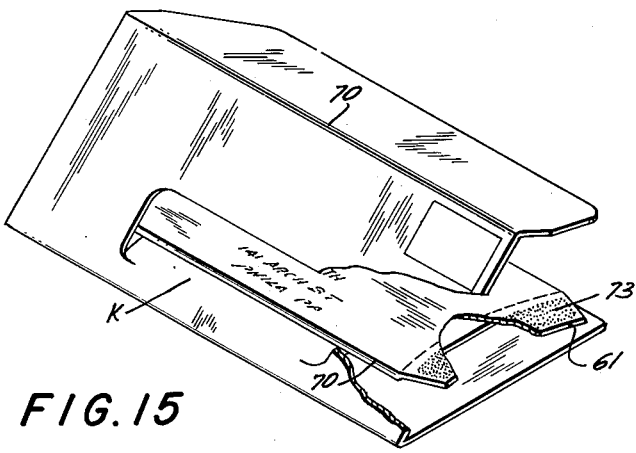
Fig. 15 is a perspective view partly broken away showing the manner in which the mailing piece is folded together.

In folding the outgoing mailing folder of Figs. 13 to 15 the fold along the folding line 70 is inserted inside of the flap K past the die cut edge 71 and it will expose the mailing address to the addressee or customer as indicated at 64. The fold 74 is inside of the score or tear line 75 which permits ready detachment of the envelope from the section 67.

It is apparent that in the arrangement shown in Figs. 13 to 20 there is a conveniently utilized outgoing mailing folder from which when unfolded may be readily detached the return mailing envelope M.

All of the arrangements shown in Figs. 1 to 20 may be readily formed of standard die cutting machinery and may be readily automatically folded into position without any manual operations. The outgoing and return mailing pieces are both within postal regulations and there is adequate space for an advertising message while a single application of the customer's or addressee's name and street address will serve both for the outgoing complete folder as well as for the detached return multi-section piece.

It is an important feature of the present invention that the locking section 10, 35 or 65 be shorter than the other sections so that it may be inserted in the locking tabs B, H and L and also that the die cut window opening B, G and K be in an adjacent section to said tabs D, H and L with the ends of the die cut lines of the window flap B, G and K being adjacent to the fold line which is adjacent to the ends of the curved die cut line or arc which forms the locking tab.

Generally the window flaps B, G and K and the locking tabs D, H and L are at adjacent sections central of the complete folder with the outside folding sections constituting respectively a return mailing piece desirably having two or more sections to be folded together for return and the opposite end section being shorter than the remaining sections so that it may be engaged in the locking tab D, H or L.

In assembly, the return mailing piece section 13, 38 and 68, 69 is first inserted in back of the window flaps G, K and L so that the signature will serve as the outgoing address.

While there has been herein described a preferred form of the invention, it should be understood that the same may be altered in details and in relative arrangement of parts within the scope of the appended claims.

Having now particularly described and ascertained the nature of the invention, and in what manner the same is to be performed:

What is claimed is:

1. A return four-section mailing piece folder having a plurality of rectangular sections connected by fold lines to be folded together, two adjacent central sections one having a large partly die cut U-outline window flap opening and the other having a small die cut arcuate locking flap and one of the end sections carrying a detachable return mailing piece with the signature of the mailing piece being inserted inside of said window flap to be exposed on the outside of the folder and to serve as the address of the folder, the ends of the cuts forming the flap opening and forming the locking flap being closely adjacent to the central fold line and the ends of the folder having opposite partial gummed applications.

2. The folder of claim 1, said folder having four rectangular sections and a central fold line between the central sections and said window flap opening and said arcuate lock flap being positioned closely adjacent to and on opposite side of said central fold line.

3. The folder of claim 1, said return mailing piece also extending into the area of one of the central sections.

4. The folder of claim 1, said flap opening and said locking flap being positioned on opposite sides of said central sections.

References Cited in the file of this patent

UNITED STATES PATENTS

| | | |
|---|---|---|
| 1,134,082 | Valasek | Mar. 30, 1915 |
| 2,402,821 | Kosteling | June 25, 1946 |